United States Patent [19]

Wheatley et al.

[11] 4,314,579
[45] Feb. 9, 1982

[54] GATE VALVE

[76] Inventors: Charles Wheatley, 2909 E. 29th St., Tulsa, Okla. 74135; Phyllis A. Wheatley, 25308 E. 65th St., Broken Arrow, Okla. 74012

[21] Appl. No.: 131,286

[22] Filed: Mar. 18, 1980

[51] Int. Cl.³ ............................................. F16K 23/00
[52] U.S. Cl. .................................... 137/312; 251/199; 251/204
[58] Field of Search ....................... 251/197, 199, 204; 137/312

[56] References Cited

U.S. PATENT DOCUMENTS

| 2,906,491 | 9/1959 | Young ............................. 251/204 X |
| 3,050,077 | 8/1962 | Wheatley ........................ 251/204 X |
| 3,695,578 | 10/1972 | Walther ............................... 251/197 |

FOREIGN PATENT DOCUMENTS 1150250 2/1961 Fed. Rep. of Germany ...... 251/197

Primary Examiner—Harold W. Weakley
Attorney, Agent, or Firm—Head & Johnson

[57] ABSTRACT

A gate valve comprising a valve body having oppositely disposed inlet and outlet ports, a valve closure member reciprocally disposed within the valve body and interposed between the inlet and outlet ports to provide alternate open and closed positions for the valve, a valve seat provided in the valve body and disposed on the upstream side of the closure member for sealing of the valve in the closed position thereof.

3 Claims, 5 Drawing Figures

GATE VALVE

BACKGROUND OF THE INVENTION

1. Field of the Invention

This invention relates to improvements in gate valves and more particularly, but not by way of limitation, to a gate valve having the sealing means disposed on the upstream side of the closure means.

2. Description of the Prior Art

Gate valves are in widespread use for providing a positive control of the flow of fluids through pipe lines, and the like. These valves are normally provided with a gate member which is interposed between the inlet and outlet ports of the valve, and which is reciprocal within the valve body to provide selective open and closed positions therefor. A valve seat is normally provided in the valve body for engagement with the gate member in the closed position of the valve for precluding leakage of fluid. The valve seat is usually disposed on the downstream side of the closure member, and in the closed position of the valve, the pressure of the fluid in the line bears against the closure member for urging the member tightly against the valve seat. Whereas this has been considered a desirable arrangement since the pressure of the fluid may increase the sealing pressure between the gate and the sealing members of the valve seat. However, under actual use conditions, it is frequently very difficult to open the valve since the great forces on the gate member must be overcome in order to raise the gate member from the closed position in the valve body. In order to alleviate this problem, a gate valve as shown in my prior U.S. Pat. No. 3,050,077, issued Aug. 21, 1962, and entitled "Double Sealed Gate Valve" was developed but the construction of this valve is complicated and expensive.

SUMMARY OF THE INVENTION

The present invention contemplates a novel gate valve which has been particularly designed and constructed for overcoming this disadvantage. The novel valve comprises a valve body having oppositely disposed inlet and outlet ports providing a fluid passageway therethrough. A gate member or valve closure is interposed between the inlet and outlet ports for intermittently interrupting the flow of fluid therebetween, thus providing alternate open and closed positions for the valve. The gate member may be actuated by either a non-rising or rising valve stem, as is well known. A valve seat is provided conterminous with the inlet port and is provided with suitable sealing means for engagement with the upstream face of the gate member in the closed position thereof. The sealing means provides an efficient sealing of the valve for precluding leakage of fluid around the closed gate member. In addition, the opening of the gate member is greatly enhanced since the fluid pressure on the upstream side of the gate member facilitates the opening thereof. It is also preferable to provide a seal testing means for assuring that the seal means is in an efficient operating condition, thus increasing the environmental efficiency of the valve. The novel gate valve is simple and efficient in operation and economical and durable in construction.

DESCRIPTION OF THE PREFERRED EMBODIMENT

Figure 1:
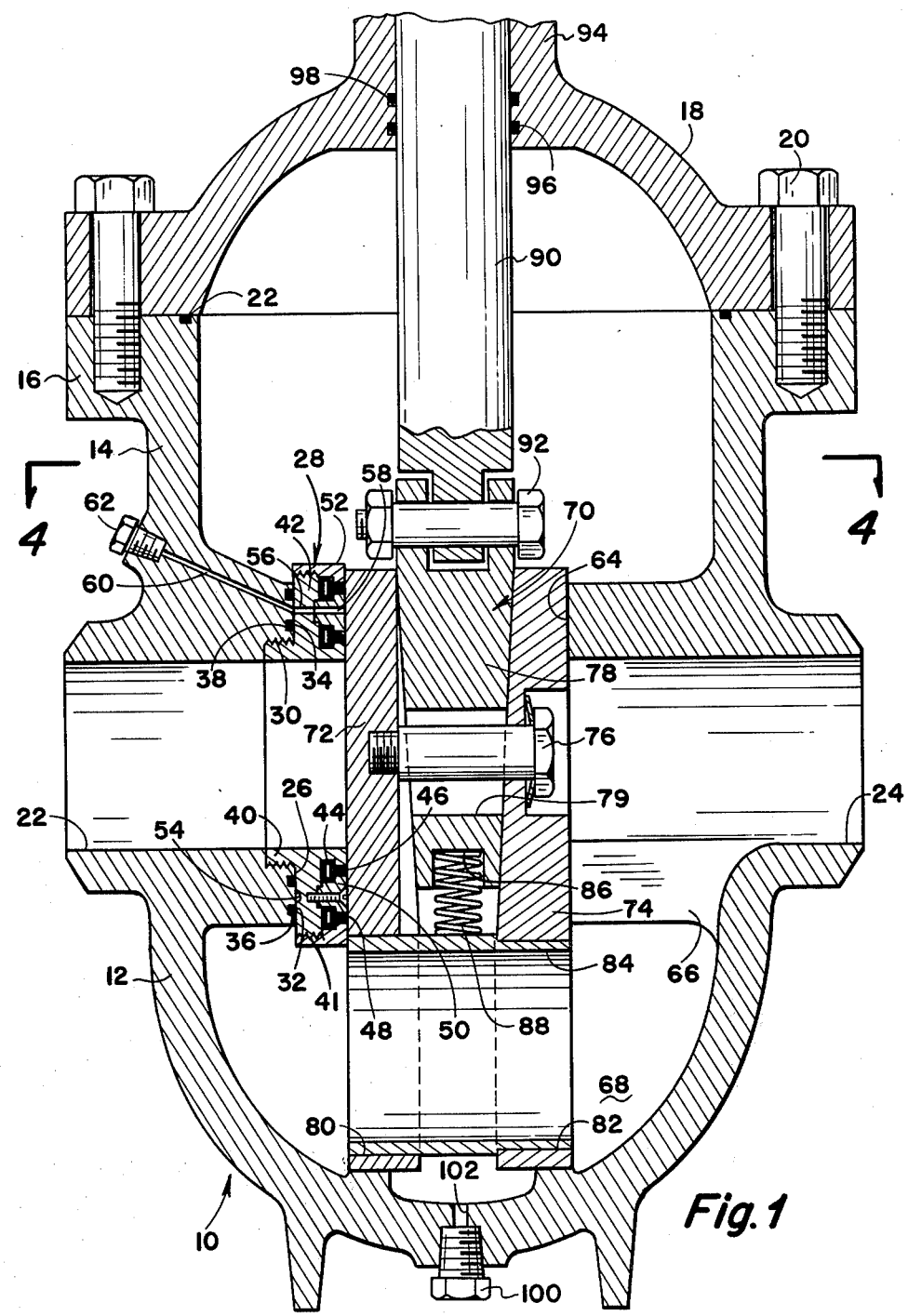
FIG. 1 is a sectional elevational view of a gate valve embodying the invention, and illustrates a closed position for the valve.

Referring to the drawings in detail, reference character 10 generally indicates a gate valve comprising a body 12 having an upstanding neck portion open at the upper end thereof, as viewed in the drawings, and provided with a circumferential flange 16 extending around the outer periphery thereof. A substantially dome-shaped cover 18 is removably secured to the flange 16 in any suitable manner, such as by a plurality of circumferentially spaced bolts 20, for providing access to the interior of the body 12. A suitable seal ring 22 is preferably interposed between the cover 18 and the flange 16 for precluding leakage of fluid therebetween. The body 12 is provided with an inlet bore 22 extending transversely therein from the upstream side of the valve 10. An outlet bore 24 is provided in the body 12 and extends oppositely from the inlet bore 22 on the down stream side of the valve 10. The flow of fluid through the valve 10 is preferably from left to right as viewed in FIGS. 1 and 2.

An annular shoulder 26 is provided on the inner end of the inlet bore 22 for receiving a valve seat assembly generally indicated at 28. The bore 22 is provided with a threaded recess 30 adjacent the shoulder 26 for threadedly securing the valve seat assembly 28 thereagainst. It is also preferable to provide a pair of concentrically arranged annular grooves 32 and 34 in the shoulder 26 for receiving O-ring seal members 36 and 38 therein for precluding leakage of fluid between the valve seat assembly 28 and the shoulder 26.

The seat assembly 28 comprises a sleeve member 40 having the outer periphery thereof threaded at one end 41 for engagement with the threads 30 and having an outwardly extending circumferential flange 42 for bearing against the shoulder 26. A recess 44 is provided around the outer periphery of the sleeve 40 and is disposed on the opposite side of the threaded portion 41 for receiving a suitable sealing ring 46 therein. A second sealing ring 48 is disposed against the flange 42 oppositely disposed from the shoulder 26 and concentrically arranged with respect to the ring 46. A substantially annular spaced member 50 is interposed between the sealing rings 46 and 48 and is preferably bolted, or otherwise removable secured to the flange 42 for facilitating retaining of the seal rings in position. In addition, the outer periphery of the flange 42 is threaded for receiving a flanged sleeve 52 thereon which bears against the rings 50 and cooperates with the retainer 50 for securing the ring 50 in position against the flange 42.

An annular groove or recess 54 is provided in the face of the flange 42 which is disposed adjacent the shoulder 26, and at least one longitudinally extending bore 56 extends through the flange to provide communication between the groove 54 and a bore 58 provided in the ring or retainer 50. An angularly disposed bore 60 is provided in the valve body 12 and extends between the exterior thereof into communication with the annular groove 54. A suitable bleeder valve 62 is threadedly secured at the outer end of the bore 60 whereby the efficiency of the seaing action of the seal, as will be hereinafter set forth.

Whereas the seal rings 46 and 48 may be of any suitable type, it is preferable that they be of the type shown in my prior U.S. Pat. No. 2,886,284, issued May 12, 1959, and entitled "Flanged Sealing Ring."

Figure 2:
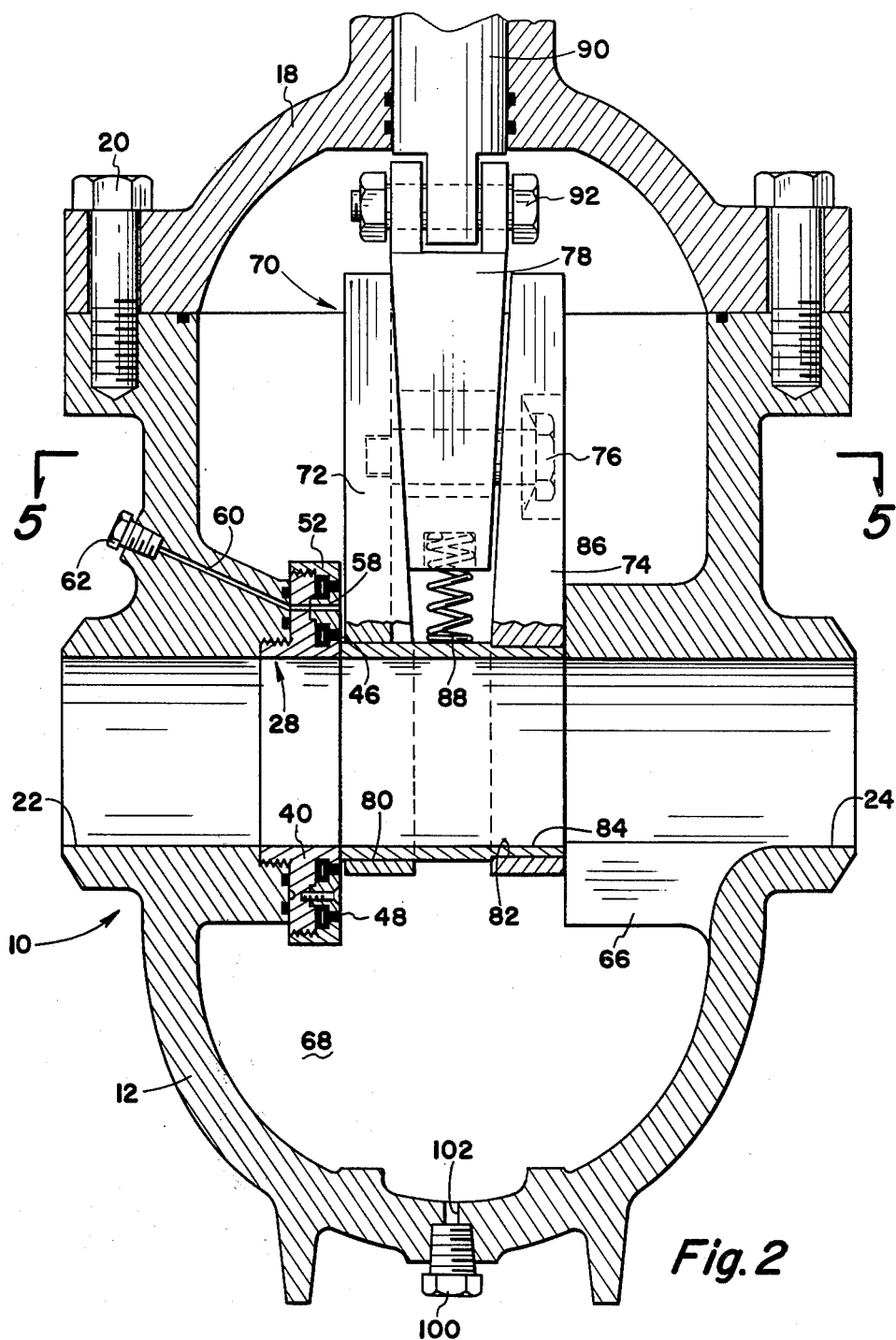
FIG. 2 is a sectional elevational view of a gate valve embodying the invention, and illustrates an open position for the valve.
Figure 3:
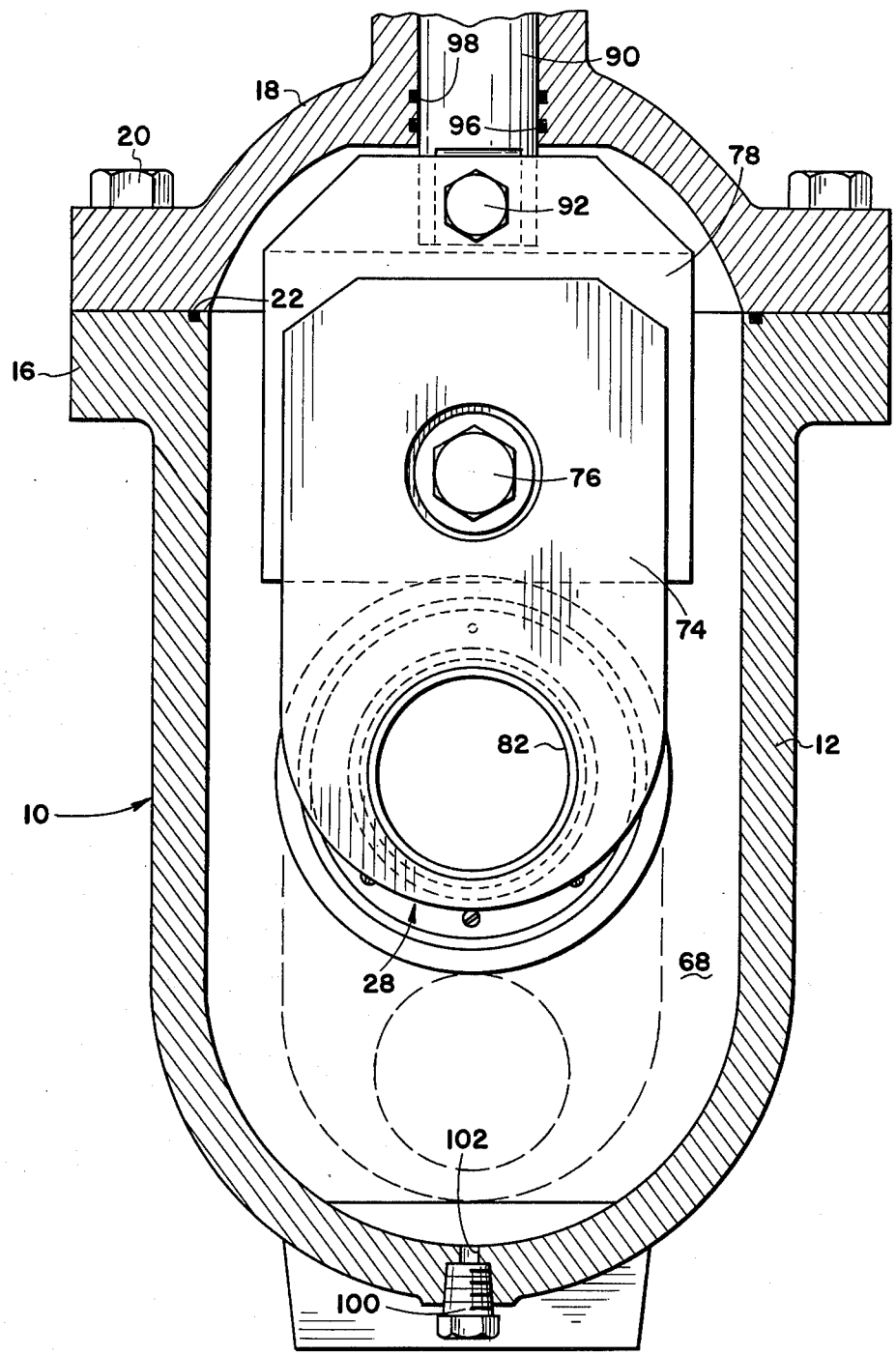
FIG. 3 is a sectional elevation view of a gate valve embodying the invention, taken at right angles with respect to FIGS. 1 and 2, with portions depicted in elevation, and illustrates an open position in solid lines and a closed position in broken lines.
Figure 4:
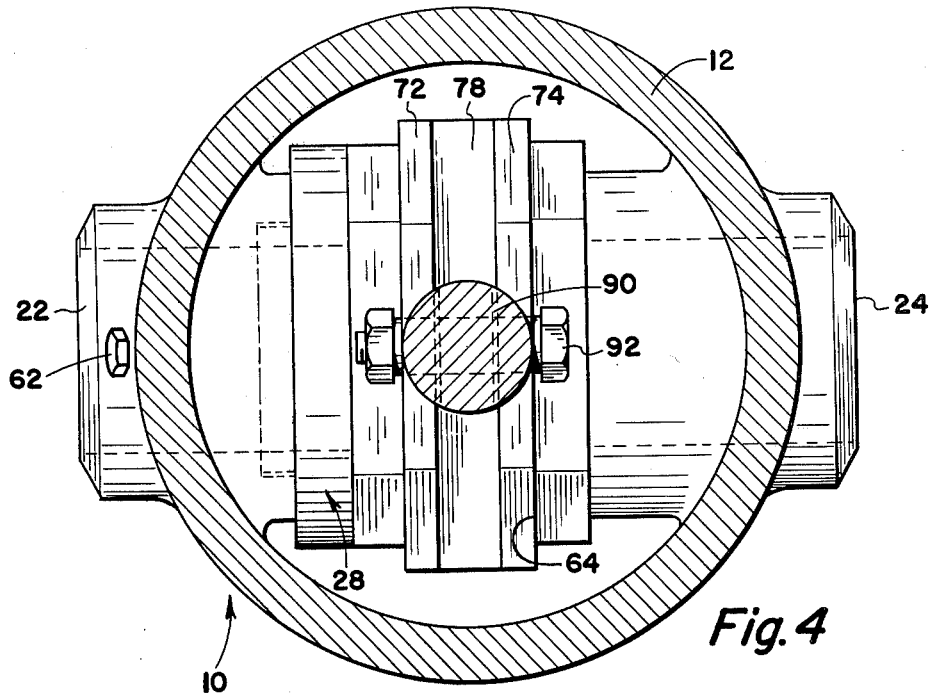
FIG. 4 is a sectional view taken on line 4—4 of FIG. 1.
Figure 5:
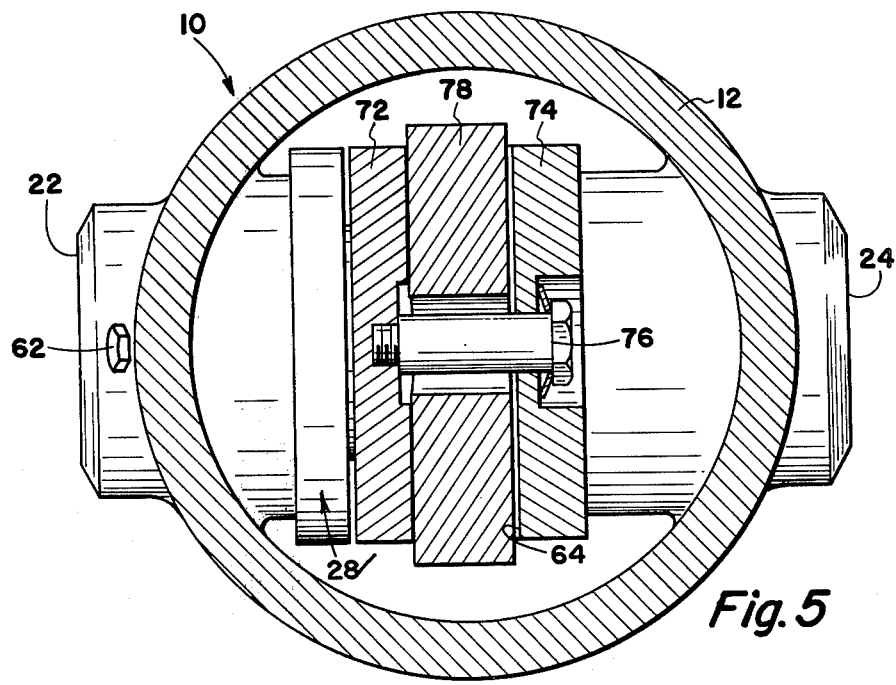
FIG. 5 is a sectional view taken on line 5—5 of FIG. 2.

An annular shoulder 64 is provided on the inner end of the outlet passageway 24, and is provided with a hiatus 66 therein for providing communication between the outlet passageway 24 and a chamber 68 provided in the lower portion of the body 12, as viewed in the drawings. A reciprocal gate means 70 is interposed between the shoulder 64 and the valve seat assembly 28 and is movable between a lowered portion within the body 12, as shown in FIG. 1, and an upper position therein as shown in FIG. 2. In the lowered position of the gate means 70, communication between the inlet bore 22 and outlet bore 24 is precluding, thus providing a closed position for the valve 10. In the upper position for the gate means 70, communication is established between the inlet and outlet passageways, thus providing an open position for the valve 10.

The gate means comprises a first plate member 72 having substantially straight outer surface and an angularly disposed inner surface, as particularly shown in FIGS. 1 and 2. A second plate member 74 is removably secured to the plate 72 in any suitable manner, such as by a centrally disposed bolt means 76, and is spaced therefrom for receiving a wedge member 78 therebetween. The plate member 74 is provided with a substantially flat outer face disposed substantially perpendicular with respect to the longitudinal axes of the bores 22 and 24, and an angularly disposed inner face, as particularly shown in FIGS. 1 and 2. The wedge member 78 is of a substantially slab-like configuration and is provided with inwardly diverging oppositely disposed faces which engage the inwardly directed faces of the plates 72 and 74 during opening and closing of the valve 10, as will be hereinafter set forth in detail. In addition, a central bore 98 is provided in the wedge 78 for loosely receiving the bolt 76 therethrough.

The plate 72 is provided with a bore 80 in the lower portion thereof as viewed in the drawings, and the plate 74 is provided with a similar bore 82 disposed in substantial alignment with the bore 80. A sleeve 84 is disposed in the bores 80 and 82 and may be secured therein in any suitable manner (not shown) to provide a fluid passageway through the gate means 70. The lower end of the wedge member 78 is provided with a centrally disposed bore 86 for receiving one end of a suitable helical spring 88 therein. The opposite end of the spring 88 bears against the outer periphery of the sleeve 84 for constantly urging the sleeve 84 in a direction away from the wedge member 78 for a purpose as will be hereinafter set forth.

A valve stem 90 is secured to the upper end of the wedge 78 in any suitable manner, such as by a bolt means 92, and extends upwardly therefrom through a boss member 94 provided in the cover 18. Of course, it is preferable to interpose suitable sealing members 96 and 98 between the outer periphery of the valve stem 90 and the inner periphery of the boss 94 for precluding leakage of fluid therebetween. The valve stem 90 may be of a non-rising type, or a rising type, as desired. In the event the valve stem 90 is a non-rising valve stem, rotation of the valve stem in one direction will cause the gate means 70 to rise within the valve body 12 and rotation of the valve stem in an opposite direction will cause the gate means 70 to move downwardly within the valve body 12 without any longitudinal displacement of the valve stem itself. In the event the valve stem 90 is a rising type valve stem, rotation of the valve stem in one direction will cause both the gate means 70 and valve stem 90 to rise with respect to the valve body 12 and rotation of the valve stem in an opposite direction will cause both the valve stem and gate means 70 to move downwardly within the valve body. Valve stem of both types are well known in the industry.

In operation, the valve 10 may be interposed in a flow line in any well known manner (not shown) whereby the inlet and outlet passageways 22 and 24 are in substantial alignment with the internal passageway of the flow line. As long as it is desirable that the fluid moving through the flow line should pass through the valve 10, the gate member 70 is disposed in the uppermost position thereof as shown in FIG. 2. In this position, the wedge member 78 is raised within the valve body 12 until the sleeve 84 is disposed in substantial alignment with the inlet and outlet bores 22 and 24, thus providing an uninterrupted fluid passageway through the valve. In this position, the wedge member 78 will be disposed in the uppermost position therefor, and the spring member 88 will urge the sleeve 84 in a downward direction as viewed in the drawings, thus assuring that the sleeve 84 will be retained in axial alignment with the inlet and outlet passageways 22 and 24.

When the valve 10 is to be closed for precluding the flow of fluid therethrough, the valve stem 90 is properly actuated for movement of the wedge member 78 in a downward direction within the valve body 12. As the wedge 78 moves downwardly, the inner periphery of the bores 79 will engage the outer periphery of the bolt 76 and a continued downward movement of the wedge 78 will cause the plates 72 and 74 to move downwardly simultaneously therewith. The wedging configuration of the outer faces of the wedge member 78 and the inner faces of the plates 72 and 74 cooperate as the wedge moves downwardly for urging the outer faces of the plates 72 and 74 into a sealing engagement with the valve seat 28 and annular shoulder 64, respectively, thus assuring an efficient sealing between the plates 72 and 74 and the inlet and outlet bores 22 and 24. In addition, the spring member 88 acting against the outer periphery of the sleeve 84 maintains the plates 72 and 74 and in the lower most position therefor until such time as it is desired to elevate the gate means 70 for opening of the valve.

When it is desired to open the valve 10, the valve stem 90 may be actuated in the proper manner for causing the wedge member 78 to rise within the valve body. The initial upward movement of the wedge is independent of the upward movement of the plates 72 and 74, and this slightly relieves the wedge pressure of the plates against the valve seat 28 and shoulder 64. This permits the fluid at the upstream side of the gate means 70 to push the plate member 72 in a downstream direction for facilitate the relieving of the sealing pressure between the valve seat 28 and the plate 72, thus greatly enhancing the opening of the valve. As the wedge 78 moves a sufficient distance in the upward direction, the inner periphery of the bore 79 engages the outer periphery of the bolt 76, and thus "picks up" the plates 72 and 74 for raising thereof within the valve body 12. When the wedge 78 has been moved to the uppermost position thereof as shown in FIG. 2, the sleeve will be disposed in alignment with the bores 22 and 24 as hereinafter set forth.

When the gate means 70 has been lowered to the closed position for the valve 10, any fluid which may be trapped within the chamber 68 of the valve body 12 may escape therefrom through the opening or hiatus 66 for discharge from the valve through the outlet bore 24. In addition, it may be desirable to ascertain the efficiency of the seating members 46 and 48 in order to assure that there is no leakage in the closed position of the valve. The bleed valve 62 may be opened or removed from the passageway 60 to detect the presence of fluid between the seal members as is well known, and any fluid which has leakage around the seal 46 may be bled off, thus assuring the efficient operation of the valve 10. Of course, a suitable drain plug 100 may be threadedly secured in a drain port 102 provided in the body 12 and in communication with the chamber 68, as is well known.

From the foregoing it will be apparent that the present invention provides a novel gate valve wherein the sealing elements are disposed upstream of the gate member. The gate member is provided with wedge means for assuring an efficient sealing of the valve in the closed position thereof, and the fluid pressure against the upstream face of the gate member facilitates the opening of the valve since the gate member does not have to overcome the pressure during the opening thereof.

Whereas the present invention has been described in particular relation to the drawings attached hereto, it should be understood that other and further modifications, apart from those shown or suggested herein may be made within the spirit and scope of this invention.

What is claimed is:

1. A gate valve comprising a valve body, oppositely disposed inlet and outlet ports provided in the body, valve seat means removably secured to the inner end of the inlet port, an annular shoulder provided on the inner end of the outlet port, gate means interposed between the valve seat means and annular shoulder and reciprocal in directions substantially perpendicular to the longitudinal axes of the inlet and outlet ports to provide alternate open and closed positions for the valve, the outer faces of said gate means being substantially flat and mutually parallel for simultaneously engaging the valve seat means and annular shoulder in the closed position of the valve and having passageway means extending therethrough for alignment with the inlet and outlet ports in the open position of the valve, and spring urged internally disposed wedge means provided in said gate means for facilitating the sealing engagement of the gate means with the valve seat means in the closed position of the valve and facilitating the movement of the gate means to the open position, said gate means comprising a pair of plate members, each of said plate members being provided with an outer face substantially perpendicular to the axis of the inlet and outlet ports and an innerface inwardly diverging, bolt means securing said plate members in spaced relationship and providing for a limited movement of the plate members in the axial direction of the inlet and outlet ports, said spring urged wedge means being disposed between the plate members and having bore means for receiving the bolt means therethrough whereby the wedge means is movable in a direction perpendicular to the axis of the inlet and outlet ports independent of the movement of the plate members during the initiation of a closing and opening of the valve and simultaneously therewith for completion of the opening and closing of the valve.

2. A gate valve as set forth in claim 1 wherein said spring urged wedge means comprises a slab member having the opposite faces thereof mutually diverging complementary with the diverging surface of the plate members for engagement thereof during opening and closing of the valve, and spring means interposed between the slab member and the sleeve for facilitating operation of the valve.

3. A gate valve as set forth in claim 1 wherein said valve seat means includes a pair of concentrically arranged seal members engageable with the upstream face of the gate means in the closed position of the valve, and bleed valve means in communication with the valve seat means at a point interposed between the seal member for assuring an efficient seal of the valve in the closed position.

* * * * *